(12) United States Patent
You et al.

(10) Patent No.: US 10,986,651 B2
(45) Date of Patent: Apr. 20, 2021

(54) INFORMATION TRANSMISSION METHOD AND APPARATUS

(71) Applicant: HUAWEI TECHNOLOGIES CO., LTD., Shenzhen (CN)

(72) Inventors: Chunhua You, Shanghai (CN); Li Zhao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/831,341

(22) Filed: Mar. 26, 2020

(65) Prior Publication Data

US 2020/0229212 A1 Jul. 16, 2020

Related U.S. Application Data

(63) Continuation of application No. PCT/CN2018/108259, filed on Sep. 28, 2018.

(30) Foreign Application Priority Data

Sep. 28, 2017 (CN) .......................... 201710899863.0

(51) Int. Cl.
  *H04W 72/12* (2009.01)
  *H04W 72/04* (2009.01)
  *H04W 52/36* (2009.01)

(52) U.S. Cl.
  CPC ..... *H04W 72/1242* (2013.01); *H04W 52/365* (2013.01); *H04W 72/044* (2013.01); *H04W 72/1284* (2013.01)

(58) Field of Classification Search
  CPC ............ H04W 52/365; H04W 72/044; H04W 72/1242; H04W 72/1284
  (Continued)

(56) References Cited

U.S. PATENT DOCUMENTS

| 2011/0080881 | A1* | 4/2011 | Hsu ...................... H04W 52/365 370/329 |
| 2012/0033606 | A1 | 2/2012 | Chun et al. |

(Continued)

FOREIGN PATENT DOCUMENTS

| CN | 102137441 A | 7/2011 |
| CN | 102595599 A | 7/2012 |

(Continued)

OTHER PUBLICATIONS

3GPP TS 36.321 V14.3.0:"3rd Generation Partnership Project;Technical Specification Group Radio Access Network; Evolved Universal Terrestrial Radio Access (E-UTRA);Medium Access Control (MAC) protocol specification(Release 14)",Jun. 2017,total 107 pages.

(Continued)

*Primary Examiner* — Tan H Trinh
(74) *Attorney, Agent, or Firm* — Stein IP, LLC (57) ABSTRACT

An information transmission method and an apparatus, such that the method includes: a terminal device sending first information and a time indication of the first information to a network device, where the first information includes a buffer status report (BSR) and/or a power headroom report (PHR), and the time indication is used to indicate a generation time and/or an initial transmission time of the first information.

11 Claims, 5 Drawing Sheets

```
A network device receives first information sent
by a terminal device, where the first information      — S401
includes a BSR and/or a PHR

↓

The network device receives a time indication of
the first information that is sent by the terminal
device, where the time indication is used to           — S402
indicate a generation time and/or an initial
transmission time of the first information
```

(58) Field of Classification Search
USPC .......... 455/69, 522; 370/252, 280, 312, 328, 370/329
See application file for complete search history.

(56) References Cited

U.S. PATENT DOCUMENTS

| | | | | |
|---|---|---|---|---|
| 2012/0224535 A1* | 9/2012 | Kim | .................... | H04W 72/042 370/328 |
| 2013/0121297 A1* | 5/2013 | Kim | .................... | H04L 5/0094 370/329 |
| 2015/0334637 A1* | 11/2015 | Kim | .................... | H04W 52/365 370/312 |
| 2015/0358998 A1* | 12/2015 | Golitschek Edler Von Elbwart | ................ | H04W 48/16 370/280 |
| 2016/0029235 A1* | 1/2016 | Kim | .................... | H04W 24/08 370/252 |
| 2017/0055294 A1* | 2/2017 | Lee | .................... | H04W 74/0833 |
| 2018/0034515 A1* | 2/2018 | Guo | .................... | H04B 7/0404 |
| 2018/0041410 A1* | 2/2018 | Yi | .................... | H04W 28/0278 |
| 2018/0231518 A1* | 8/2018 | Vaidya | .................... | G01N 11/00 |
| 2018/0324768 A1* | 11/2018 | Shaheen | ............ | H04L 5/0092 |
| 2018/0368173 A1* | 12/2018 | Shaheen | ........... | H04W 72/1289 |
| 2019/0037555 A1 | 1/2019 | Kim et al. | | |
| 2019/0082397 A1* | 3/2019 | Hwang | ............... | H04W 52/365 |
| 2019/0174512 A1* | 6/2019 | Takahashi | ......... | H04W 72/1284 |
| 2019/0280820 A1* | 9/2019 | Kim | .................... | H04W 74/008 |
| 2019/0356450 A1* | 11/2019 | He | .................... | H04W 72/0406 |
| 2019/0373669 A1* | 12/2019 | Dai | ........................ | H04W 52/50 |

FOREIGN PATENT DOCUMENTS

| | | |
|---|---|---|
| CN | 102802209 A | 11/2012 |
| CN | 102907161 A | 1/2013 |
| CN | 105230103 A | 1/2016 |
| CN | 106162911 A | 11/2016 |
| CN | 106416368 A | 2/2017 |
| CN | 106664595 A | 5/2017 |
| CN | 106937397 A | 7/2017 |
| CN | 107046728 A | 8/2017 |
| CN | 104981999 B | 10/2019 |
| EP | 2314028 A1 | 4/2011 |
| EP | 2665320 A1 | 11/2013 |
| WO | 2016119160 A1 | 8/2016 |
| WO | 2016171420 A1 | 10/2016 |
| WO | 2017131389 A1 | 8/2017 |

OTHER PUBLICATIONS

3GPP TS 36.213 V12.12.0 (Sep. 2017),3rd Generation Partnership Project;Technical Specification Group Radio Access Network;Evolved Universal Terrestrial Radio Access (E-UTRA);Physical layer procedures(Release 12), total 241 pages.

* cited by examiner

Base station

Terminal device

FIG. 1

A terminal device sends first information to a network device, where the first information includes a BSR and/or a PHR — S101

The terminal device sends a time indication of the first information to the network device, where the time indication is used to indicate a generation time and/or an initial transmission time of the first information — S102

INFORMATION TRANSMISSION METHOD AND APPARATUS

CROSS-REFERENCE TO RELATED APPLICATIONS

This application is a continuation of International Application No. PCT/CN2018/108259, filed on Sep. 28, 2018, which claims priority to Chinese Patent Application No. 201710899863.0, filed on Sep. 28, 2017, The disclosures of the aforementioned applications are hereby incorporated by reference in their entireties.

TECHNICAL FIELD

Aspects of this application relate to communications technologies, and in particular, to an information transmission method and an apparatus.

BACKGROUND

Currently, a request-grant-based uplink data transmission method is mainly used for an existing mobile communications system. However, with increasing application scenarios, terminal types and application types, in an evolution process of a future mobile communications system, a quantity of terminal devices will increase explosively. In specific application scenarios, users will have higher requirements on a network latency and make full use of unlicensed spectrum resources. In this case, the conventional request-grant-based uplink data transmission method is not applicable any more because of a relatively high latency and relatively high signaling overheads, so that scheduling-free transmission comes into being.

In the scheduling-free transmission, when a terminal device has a data sending requirement, the terminal device does not need to request a scheduling resource from a base station, and may directly use a preallocated resource to send uplink data. Therefore, the scheduling-free transmission is of great advantage in terms of the network latency and signaling overheads. In the scheduling-free transmission, the terminal device will add control information of a media access control (MAC) layer, for example, a buffer status report (BSR) and a power headroom report (PHR), and service data together to a MAC protocol data unit (MAC PDU), and send the MAC protocol data unit to a network device.

However, in the scheduling-free transmission, because a scheduling-free resource may be used for new transmission and retransmission of data, when the terminal device needs to send uplink service data in a scheduling-free resource corresponding to a first time unit, the terminal device obtains a BSR and/or a PHR of the first time unit, and adds the BSR and/or the PHR of the first time unit and the uplink service data to a same MAC PDU. When a channel access process is not completed, a channel quality is relatively poor, or other cases occur, the network device may not be able to determine whether the terminal device sends the MAC PDU. If the terminal device retransmits a scheduling-free resource that is corresponding to a second time unit and that is in the MAC PDU to the network device, the network device cannot determine whether a BSR and a PHR that are carried in the MAC PDU are of the first time unit or the second time unit. The foregoing scenario will cause inconsistency between time units corresponding to the BSR and/or the PHR and determined by the terminal device and the network device, thereby affecting subsequent scheduling of the network device.

SUMMARY

Aspects of this application provide an information transmission method and an apparatus, so that time units corresponding to a BSR and/or a PHR and determined by a terminal device and a network device are consistent.

A first aspect of this application provides an information transmission method, including: sending, by a terminal device, first information and a time indication of the first information to a network device, where the first information includes a BSR and/or a PHR, and the time indication is used to indicate a generation time and/or an initial transmission time of the first information.

Optionally, the method further includes:
determining, by the terminal device, a first channel access priority class based on data in an uplink buffer;
receiving, by the terminal device, a second channel access priority class sent by the network device;
determining, by the terminal device, a channel access process to be used based on the first channel access priority class and the second channel access priority class; and
detecting, by the terminal device, whether a channel is idle based on a channel detection parameter corresponding to the channel access process.

Optionally, the determining, by the terminal device, the channel access process to be used based on the first channel access priority class and the second channel access priority class includes:
determining, by the terminal device when the first channel access priority class is lower than the second channel access priority class, that the channel access process to be used is a first channel access process; and determining, by the terminal device when the first channel access priority class is higher than or equal to the second channel access priority class, that the channel access process to be used is a second channel access process, where the first channel access process is a rollback-based channel detection process, and the second channel access process is a channel detection process that is based on fixed duration; or
determining, by the terminal device when the first channel access priority class is higher than or equal to the second channel access priority class, that the channel access process to be used is the first channel access process; and determining, by the terminal device when the first channel access priority class is lower than the second channel access priority class, that the channel access process to be used is the second channel access process, where the first channel access process is the rollback-based channel detection process, and the second channel access process is the channel detection process that is based on fixed duration.

Optionally, the method further includes:
receiving, by the terminal device, a second channel access priority class sent by the network device;
determining, by the terminal device, a data volume of to-be-transmitted data corresponding to the second channel access priority class from the data in the uplink buffer; and
generating first data when the data volume of the to-be-transmitted data corresponding to the second channel access priority class is greater than or equal to a preset first threshold, where the first data includes the to-be-transmitted data corresponding to the second channel access priority class and the first information.

A second aspect of this application provides an information transmission method, including: receiving, by a network device, first information and a time indication of the first information that are sent by a terminal device, where the first information includes a BSR and/or a PHR, and the time indication is used to indicate a generation time and/or an initial transmission time of the first information.

Optionally, the method further includes: sending, by the network device, a second channel access priority class to the terminal device.

A third aspect of this application provides a terminal device, including: a sending module, configured to send first information to a network device, where the first information includes a BSR and/or a PHR. The sending module is further configured to send a time indication of the first information to the network device, where the time indication is used to indicate a generation time and/or an initial transmission time of the first information.

Optionally, the terminal device further includes:
a processing module, configured to determine a first channel access priority class based on data in an uplink buffer; and
a receiving module, configured to receive a second channel access priority class sent by the network device.

The processing module is further configured to determine a channel access process to be used based on the first channel access priority class and the second channel access priority class.

The processing module is further configured to detect whether a channel is idle based on a channel detection parameter corresponding to the channel access process.

Optionally, the processing module is specifically configured to:
determine, when the first channel access priority class is lower than the second channel access priority class, that the channel access process to be used is a first channel access process; and determine, when the first channel access priority class is higher than or equal to the second channel access priority class, that the channel access process to be used is a second channel access process, where the first channel access process is a rollback-based channel detection process, and the second channel access process is a channel detection process that is based on fixed duration; or
determine, when the first channel access priority class is higher than or equal to the second channel access priority class, that the channel access process to be used is the first channel access process; and determine, when the first channel access priority class is lower than the second channel access priority class, that the channel access process to be used is the second channel access process, where the first channel access process is a rollback-based channel detection process, and the second channel access process is a channel detection process that is based on fixed duration.

Optionally, the terminal device further includes:
a receiving module, configured to receive a second channel access priority class sent by the network device; and
a processing module, configured to determine a data volume of to-be-transmitted data corresponding to the second channel access priority class from the data in the uplink buffer.

The processing module is further configured to generate first data when the data volume of the to-be-transmitted data corresponding to the second channel access priority class is greater than or equal to a preset first threshold, where the first data includes the to-be-transmitted data corresponding to the second channel access priority class and the first information.

A fourth aspect of this application provides a network device, including:
a receiving module, configured to receive first information sent by a terminal device, where the first information includes a BSR and/or a PHR.

The receiving module is further configured to receive a time indication of the first information that is sent by the terminal device, where the time indication is used to indicate a generation time and/or an initial transmission time of the first information.

Optionally, the network device further includes: a sending module, configured to send a second channel access priority class to the terminal device.

Optionally, in the first aspect to the fourth aspect of this application, the time indication and the first information are sent/received by using a first resource.

Optionally, in the first aspect to the fourth aspect of this application, the first information is sent/received by using the first resource; and the time indication is sent/received by using a second resource, where the first resource and the second resource do not overlap in at least one of time domain or frequency domain.

Optionally, in the first aspect to the fourth aspect of this application, the time indication includes at least one of the following content:
a transmission quantity of the first information, where the transmission quantity of the first information is a quantity of times that the terminal device sends the first information;
an identifier of an initial transmission time unit of the first information, where the initial transmission time unit is a time unit in which the terminal device sends the first information for the first time; or
an identifier of a generation time unit of the first information, where the generation time unit is a time unit in which the terminal device generates the first information.

A fifth aspect of this application provides a terminal device, including: a processor, a memory, and a transceiver, where the memory is configured to store an instruction, the transceiver is configured to communicate with another device, and the processor is configured to execute the instruction stored in the memory, to enable the terminal device to perform the operations of the method according to the first aspect of this application.

A sixth aspect of this application provides a network device, including: a processor, a memory, and a transceiver, where the memory is configured to store an instruction, the transceiver is configured to communicate with another device, and the processor is configured to execute the instruction stored in the memory, to enable the network device to perform the operations of the method according to the second aspect of this application.

A seventh aspect of this application provides a chip system, applied to a terminal device, and including at least one processor, where the at least one processor is configured to execute a stored instruction, to enable the terminal device to perform the operations of the method according to the first aspect of this application.

An eighth aspect of this application provides a chip system, applied to a network device, and including at least one processor, where the at least one processor is configured to execute a stored instruction, to enable the network device to perform the operations of the method according to the second aspect of this application.

A ninth aspect of this application provides a computer program product, applied to a terminal device. The computer program product includes an instruction, and when the instruction is executed by a computing apparatus, the terminal device is enabled to perform the operations of the method according to the first aspect of this application.

A tenth aspect of this application provides a computer program product, applied to a network device. The computer program product includes an instruction, and when the instruction is executed by a computing apparatus, the network device is enabled to perform the operations of the method according to the second aspect of this application.

An eleventh aspect of this application provides a computer-readable storage medium, applied to a terminal device. The computer-readable storage medium stores an instruction, and when the instruction is executed by a computing apparatus, the terminal device is enabled to perform the operations of the method according to the first aspect of this application.

A twelfth aspect of this application provides a computer-readable storage medium, applied to a network device. The computer-readable storage medium stores an instruction, and when the instruction is executed by a computing apparatus, the network device is enabled to perform the operations of the method according to the second aspect of this application.

According to the information transmission method and the apparatus that are provided in this application, the terminal device sends the first information and the time indication of the first information to the network device, where the first information includes the BSR and/or the PHR, and the time indication is used to indicate the generation time and/or the initial transmission time of the first information. Carrying of the time indication of the first information enables the network device to determine, based on the time indication of the first information, a time unit corresponding to the first information, so that it is ensured that time units corresponding to the BSR and/or the PHR and determined by the network device and the terminal device are consistent. Because the time units corresponding to the BSR and/or the PHR and determined by the network device and the terminal device are consistent, the network device can schedule the terminal based on the BSR and/or the PHR, and properly allocate uplink resources.

DESCRIPTION OF EMBODIMENTS

This application provides an information transmission method. The method in this application may be applied to scheduling-free transmission, and may be applied to a licensed frequency band and may also be applied to an unlicensed frequency band in the scheduling-free transmission. The licensed frequency band may be shared by a plurality of terminal devices in a same cell or occupied by one terminal device. The unlicensed frequency band may be shared by a plurality of systems (for example, a wireless fidelity (Wi-Fi) system, and a licensed assisted access (LAA) system). To ensure coexistence and fairness, the terminal device uses a channel by using a channel access process. The channel access process may be classified into the following two modes: A first mode is rollback-based idle channel detection; and a second mode is idle channel detection that is based on fixed duration. The rollback-based idle channel detection means that the terminal device randomly selects a random value A from a contention window, and only when at least A idle slots are detected, it is considered that the channel access process is completed, and the channel can be used to transmit data. The idle channel detection based on fixed duration means that if the terminal device detects that the channel is idle in fixed duration, it is considered that the channel access process is completed, and the channel can be used to transmit data. That the terminal device detects whether the channel is idle is specifically determining whether receiving signal energy on the channel is lower than a specific threshold. If the receiving signal energy on the channel is lower than the threshold, the terminal device determines that the channel is idle; and if the receiving signal energy on the channel is higher than the threshold, the terminal device determines that the channel is busy. After the channel access process is completed, a maximum channel occupation time is specified in a protocol. A time for which the terminal device sends the data cannot exceed the maximum channel occupation time.

Figure 1:
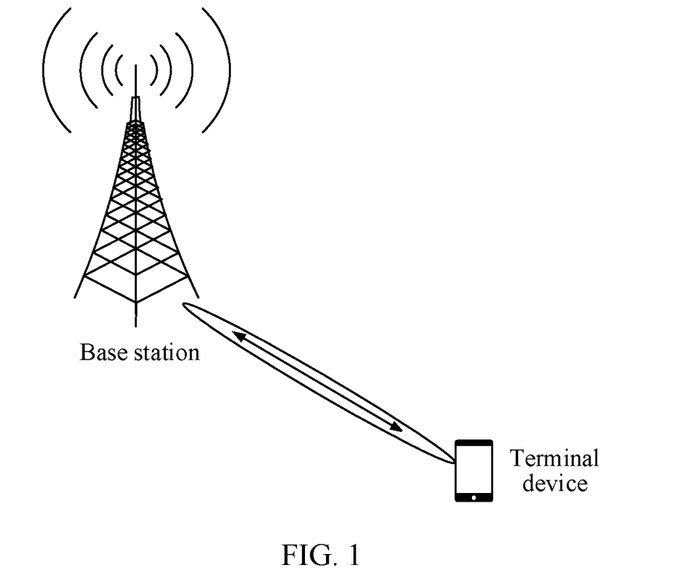
FIG. 1 is a schematic diagram of a network architecture to which an embodiment of this application is applicable.

FIG. 1 is a schematic diagram of a network architecture to which an embodiment of this application is applicable. As shown in FIG. 1, the network architecture includes a base station and at least one terminal device. It should be clear that the base station mentioned in this application may be a base transceiver station (BTS) of a global system for mobile communications (GSM) or a code division multiple access (CDMA) system, or may be a NodeB (NB) in a wideband code division multiple access (WCDMA) system, or may be an evolved NodeB (eNB), an access point (AP) or a relay station in a long term evolution (LTE) system, or may be a base station (for example, a gNB or a transmission point (TRP)) in a 5th generation (5G) mobile communication system and the like, or may be a wireless controller and a wearable device or a vehicle-mounted device in a cloud radio access network (CRAN) scenario. This is not limited herein. The 5G system is also referred to as a new wireless communications system, a new radio technology or a next-generation mobile communication system.

The terminal device mentioned in this application may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The terminal device may also be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal in a 5G network, or a terminal in a future evolved public land mobile network (PLMN).

Based on the network architecture shown in FIG. 1, the information transmission method provided in this application aims to resolve a problem of inconsistency between time units corresponding to a BSR and a PHR and determined by a terminal device and a network device in the prior art.

The technical solutions of this application and how the foregoing technology problem is resolved by using the technical solutions of this application are described below in detail by using specific embodiments. The following several example embodiments may be combined with each other, and a same or similar concept or process may not be described repeatedly in some embodiments. The following describes the embodiments of this application with reference to accompanying drawings.

Figure 2:
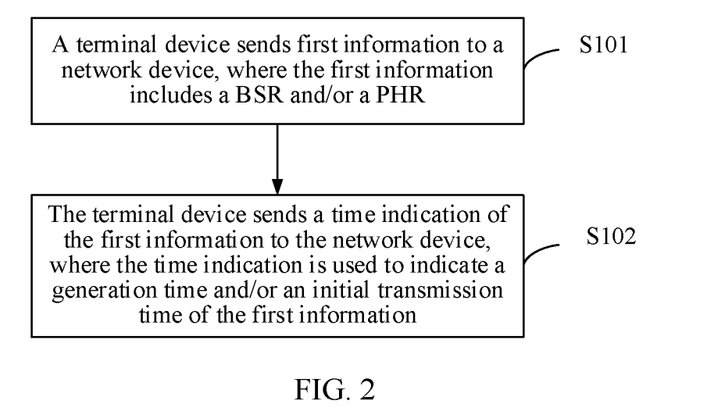
FIG. 2 is a flowchart of an information transmission method according to Embodiment 1 of this application.

FIG. 2 is a flowchart of an information transmission method according to Embodiment 1 of this application. As shown in FIG. 2, the method provided in this embodiment includes the following steps.

Step S101. A terminal device sends first information to a network device, where the first information includes a BSR and/or a PHR.

The terminal device may send the first information to the network device by using a scheduling-free first resource, where the first resource may be pre-indicated to the terminal device by the network device, and the network device may be a base station. For example, the terminal device receives a first indication and a second indication that are sent by the network device, where the first indication is used to indicate a time domain resource location of the first resource, and the second indication is used to indicate a frequency domain resource location of the first resource. The first resource is a scheduling-free resource, and may be used to send new transmission or retransmission data.

Optionally, the first indication may include: a period of the first resource and a start time unit of the first resource, where the time unit may be one of a subframe, a slot, a transmission time interval (TTI), and a symbol. Optionally, the first indication may further include at least one Hybrid Automatic Repeat request (HARQ) process ID. Optionally, the first indication may be carried by using a radio resource control (Radio Resource Control, RRC) message, where the RRC message is, for example, an RRC connection reconfiguration message. For example, a hybrid automatic repeat request HARQ process identification (ID) included in the first indication is: an ID of a HARQ process 1 and an ID of a HARQ process 2. The period of the first resource is 2 milliseconds (ms), and the start time unit of the first resource is a subframe 0. Then even number subframes such as the subframe 0, subframe 2, subframe 4 are time domain resources of scheduling-free resources of the HARQ process 1 and the HARQ process 2.

Optionally, the second indication includes a frequency band, a subcarrier, or the like that is occupied by the first resource. Optionally, the second indication is carried by using physical layer signaling, where the physical layer signaling is, for example, downlink control information (DCI). Optionally, the second indication further includes a modulation and coding scheme (MCS).

After receiving the first indication and the second indication, the terminal device determines a time-frequency resource of the first resource based on the first indication and the second indication, where the first resource may be a physical uplink shared channel (PUSCH) resource.

When the terminal device needs to send data, if the terminal device triggers the BSR, the BSR is generated; and if the terminal device triggers the PHR, the PHR is generated. The BSR is used to notify the network device of a data volume in a buffer of the terminal device, so that the network device obtains a volume of data needs to be sent by the terminal device. The BSR may be reported by using a logical channel group. One logical channel group includes at least one logical channel, and the BSR in the first information includes a sum of data volumes in buffers of logical channels in at least one logical channel group. The BSR may also be reported by using a logical channel, where the BSR in the first information includes a sum of data volumes in buffers of at least one logical channel.

The PHR is used to notify the network device of power headroom (PH) of the terminal device, where the PHR may include PH of the terminal device in at least one activated serving cell. A serving cell of the terminal device is a cell used to provide a radio resource for a terminal device in a connection state. The activated serving cell may be a serving cell that may be used for data transmission. If the terminal device is not configured with carrier aggregation (CA) or dual connectivity (DC), the terminal device has only one serving cell; and if the terminal device is configured with CA and/or DC, the serving cell of the terminal device is at least one cell, where the at least one serving cell includes a primary cell (Primary Cell, PCell) and all secondary cells (SCells). The primary cell is a cell that works on a primary frequency and in which the terminal device may perform an initial connection establishment process or launch a connection reestablishment process, or a cell that is indicated as a primary cell during a switching process. The secondary cell is a cell that works on the secondary frequency and that provides extra radio resources for the terminal device.

The PH refers to a difference between a maximum transmission power allowed by the terminal device and an estimated transmission power value of an uplink data channel. Using an example in which the uplink data channel is a PUSCH, a physical meaning of the PH means a transmission power can be used by the terminal device in addition to a transmission power used for current PUSCH transmission. Because calculation of the PH involves a transmission power of the PUSCH, the power headroom may be calculated only in a sending time unit of the PUSCH. A time unit refers to a time domain resource using a time unit of PUSCH scheduling as a granularity, and the time unit may be a subframe, a TTI, a slot, a symbol, or the like.

Optionally, the PH may alternatively be: the maximum transmission power allowed by the terminal device—the estimated transmission power value of the uplink data channel—an estimated transmission power value of an uplink control channel. The uplink data channel may include an uplink data channel of at least one of a primary cell, a primary secondary cell, or a PUCCH SCell. The PUCCH SCell is an SCell configured with the PUCCH, and the uplink data channel may include an uplink shared channel (UpLink-Share Channel, UL-SCH).

The PHR and the BSR may be sent by using a control unit of a MAC layer, where the control unit is also referred to as a control element (CE). Therefore a control unit of a MAC layer that related to the PHR is also referred to as a PHR control unit, and a control unit of a MAC layer that is related to the BSR is also referred to as a BSR control unit.

Step S102. The terminal device sends a time indication of the first information to the network device, where the time indication is used to indicate a generation time and/or an initial transmission time of the first information.

In an implementation, both the time indication and the first information are sent by using the first resource. In another implementation, the first information is sent by using a first resource; and the time indication is sent by using a second resource, where the first resource and the second resource do not overlap in at least one of time domain or frequency domain, that is, the time indication and the first information are sent by using different resources. The second resource is also pre-indicated to the terminal device by the network device. The second resource may be a PUSCH resource or a physical uplink control channel (PUCCH) resource. Optionally, the first resource may also be the PUSCH resource. When both the time indication and the first information are sent by using the first resource, the terminal device can determine, according to a preset rule, which symbols send the first information and which symbols send the time indication. The preset rule can specify that some symbols in the first resource are used to send the time indication, so that remaining symbols are used to send the first information. Correspondingly, the network device obtains, according to the preset rule, the time indication from the corresponding symbols in the first resource. The first resource may be a resource of the primary cell, or may be a resource of the secondary cell.

The time indication of the first information includes at least one of the following content: a transmission quantity of the first information, an identifier of an initial transmission time unit of the first information or an identifier of a generation time unit of the first information. The transmission quantity of the first information is a quantity of times that the terminal device sends the first information, the initial transmission time unit is a time unit in which the terminal device sends the first information for the first time and the generation time unit a time unit in which the terminal device generates the first information. The initial transmission time unit and the generation time unit may be: a subframe, a slot, a TTI, a symbol, and the like. Correspondingly, the identifier of the initial transmission time unit and the generation time unit may be: a subframe number, a slot number, a TTI number, a subframe or a slot in which a symbol is located and a location of a symbol in a subframe or a slot.

It should be noted that a channel access process needs to be performed before the first information is sent. No matter whether the channel access process is completed, the terminal device considers that transmission is performed once. For example, if the channel access process is completed before the subframe 0, the terminal device performs initial transmission of the first information to the network device, that is, transmits the first information for the first time. If the first information fails to be sent because of poor network quality or for another reason, the terminal device performs the channel access process again. If the channel access process is not completed before a subframe 10, even though the terminal device does not retransmit the first information for the first time, the terminal device still considers that the terminal device performs transmission once. If the channel access process is completed before a subframe 20, the terminal device retransmits the first information for the second time.

After generating the first information, the terminal device may send the first information instantly, and may send the first information after a while. Therefore, the generation time unit of the first information may be the same as or may be different from the initial transmission time unit of the first information. When the generation time unit of the first information is the same as the initial transmission time unit of the first information, the time indication may carry one of the identifier of the generation time unit of the first information or the identifier of the initial transmission time unit of the first information. When the generation time unit and the initial transmission time unit of the first information are different, the time indication may carry one of the identifier of the generation time unit of the first information or the identifier of the initial transmission time unit of the first information, or carry both the identifier of the generation time unit of the first information and the identifier of the initial transmission time unit of the first information. After receiving the first information and the identifier of the generation time unit of the first information and/or the identifier of the initial transmission time unit of the first information, the network device determines, based on the identifier of the generation time unit of the first information and/or the identifier of the initial transmission time unit of the first information, the time unit corresponding to the first information, thereby ensuring that time units corresponding to the BSR and/or the PHR and determined by the network device and the terminal device are consistent.

Optionally, before sending the first information, the terminal device needs to perform the channel access process. If the channel access process is not completed, the terminal device cannot send the first information. For example, when the channel access process for data transmission for the first time and the channel access process for data transmission for the second time are not completed, while the channel access process for data transmission for the third time is completed, the terminal device successfully sends the first information, and the network device can receive and correctly decode the first information. In this process, the terminal device sends the first information three times, the first information fails to be sent for the first two times, and the first information is successfully sent for the third time. The network device receives the first information and the time indication of the first information that are sent for the third time, where the time indication of the first information includes the transmission quantity of the first information: the third time. The transmission quantity of the first information is the quantity of times that the terminal device sends the first information. After the network device receives the first information and the time indication of the first information and learns of, based on the time indication of the first information, that the transmission quantity of the first information is the third time, the network device may determine, based on the transmission quantity of the first information and a receiving time unit of the first information, the initial transmission time unit of the first information, where the receiving time unit of the first information is a time unit in which the first information is received by the network device. Further, the network device determines, based on the initial transmission time unit of the first information, the time unit corresponding to the first information, so that it is ensured that the time units corresponding to the BSR and/or the PHR and determined by the network device and the terminal device are consistent, thereby enabling the network device to schedule resources more accurately, and avoiding resource waste.

When the first information includes the BSR and the PHR, the time indication can carry only one piece of indication information, where the indication information indicates both the generation time and/or the initial transmission time of the BSR and PHR, that is, the generation time and/or the initial transmission time of the BSR and the PHR are same. Alternatively, the time indication may carry two pieces of indication information, where one piece of the indication information is used to indicate the generation time and/or the initial transmission time of the BSR, and another piece of the indication information is used to indicate the generation time of the PHR. The generation time of the BSR may be the same as or may be different from the generation time of the PHR. Likewise, the initial transmission time of the BSR may be the same as or may be different from the initial transmission time of the PHR.

In this embodiment, the terminal device sends the first information and the time indication of the first information to the network device, where the first information includes the BSR and/or the PHR, and the time indication is used to indicate the generation time and/or the initial transmission time of the first information. By carrying the time indication of the first information, the network device is enabled to determine, based on the time indication of the first information, the time unit corresponding to the first information, so that it is ensured that the time units corresponding to the BSR and/or the PHR and determined by the network device and the terminal device are consistent. Because the time units corresponding to the BSR and/or the PHR and determined by the network device and the terminal device are consistent, the network device can schedule the terminal based on the BSR and/or the PHR, and properly allocate uplink resources.

Figure 3:
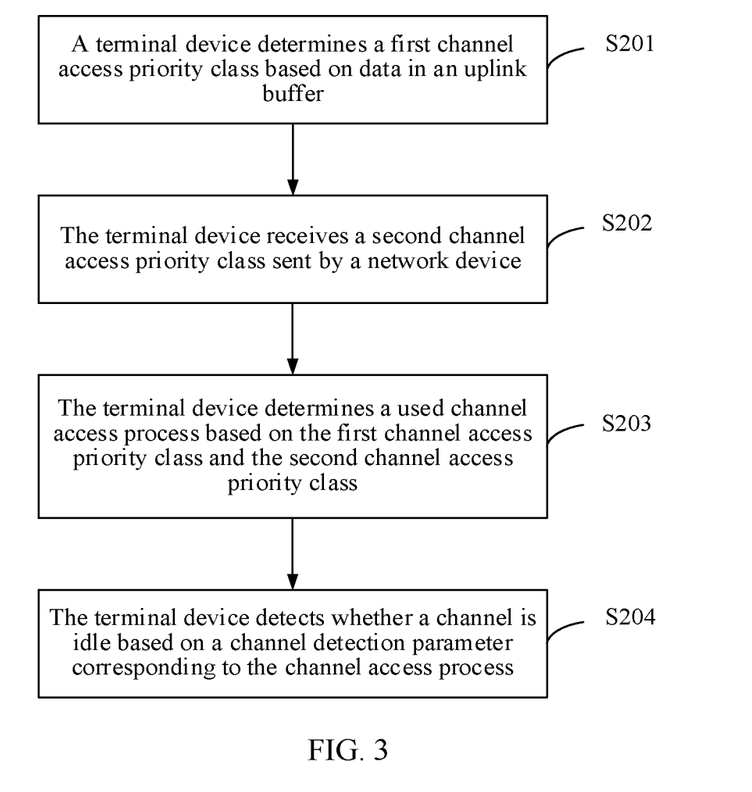
FIG. 3 is a flowchart of a channel access method according to Embodiment 2 of this application.

FIG. 3 is a flowchart of a channel access method according to Embodiment 2 of this application. It needs to be clear that steps in this embodiment may be performed based on Embodiment 1. The steps may be performed before step S101, or may be performed before step S102, or may be performed before both step S101 and step S102. The steps in this embodiment may also be performed independently, and do not depend on the method in Embodiment 1. As shown in FIG. 3, the method in this embodiment includes the following steps.

Step S201. A terminal device determines a first channel access priority class based on data in an uplink buffer.

The uplink buffer may store different types of to-be-transmitted data, and quality of service class identifiers (QCI) of different types of data are different. There is a correspondence between the QCI and a channel access priority class. One channel access priority class corresponds to at least one QCI. For example, the terminal device first determines a QCI of data in the uplink buffer, where there may be one or more QCIs of the data in the uplink buffer. Then the terminal device determines, based on the correspondence between the QCI and the channel access priority class, a channel access priority class corresponding to the QCI of the data in the uplink buffer. When there are a plurality of QCIs of the data in the uplink buffer, there may be one or more channel access priority classes corresponding to the QCIs of the data in the uplink buffer. When there are a plurality of channel access priority classes corresponding to the QCIs of the data in the uplink buffer, the terminal device determines, from the plurality of channel access priority classes corresponding to the QCIs of the data in the uplink buffer, a highest access priority as the first channel access priority class.

For example, Table 1 is a schematic diagram of QCIs and channel access priority classes. As shown in Table 1, there are four channel access priority classes: Values of QCIs corresponding to a channel access priority class 1 are 1, 3, 5, 65, 66, 69 and 70, values of QCIs corresponding to a channel access priority class 2 are 2 and 7, values of QCIs corresponding to a channel access priority class 3 are 4, 6, 8 and 9, and there is no definition of a QCI corresponding to a channel access priority class 4. Assuming that the QCI of the to-be-transmitted data in the uplink buffer of the terminal device is 8, the terminal device determines, based on the correspondence shown in Table 1, that the first channel access priority class is 3.

TABLE 1

| Channel access priority class | QCI |
| --- | --- |
| 1 | 1, 3, 5, 65, 66, 69, 70 |
| 2 | 2, 7 |
| 3 | 4, 6, 8, 9 |
| 4 | — |

Step S202. The terminal device receives a second channel access priority class sent by a network device.

The second channel access priority class is determined by the network device for the terminal device and is sent to the terminal device by using the PDCCH. The PDCCH is scrambled by using a common control radio network temporary identifier (CC-RNTI) and that can be read by at least one UE in a cell.

Step S203. The terminal device determines a channel access process to be used based on the first channel access priority class and the second channel access priority class.

For example, the terminal device compares the first channel access priority class and the second channel access priority class. When the first channel access priority class is lower than the second channel access priority class, the terminal device determines that the channel access process to be used is a first channel access process. When the first channel access priority class is higher than or equal to the second channel access priority class, the terminal device determines that the channel access process to be used is a second channel access process. The first channel access process is a rollback-based idle channel detection process, and the second channel access process is an idle channel detection process that is based on fixed duration.

Alternatively, when the first channel access priority class is higher than or equal to the second channel access priority class, the terminal device determines that the channel access process to be used is a first channel access process; and when the first channel access priority class is lower than the second channel access priority class, the terminal device determines that the channel access process to be used is a second channel access process, where the first channel access process is a rollback-based idle channel detection process, and the second channel access process is an idle channel detection process that is based on fixed duration.

Before using the scheduling-free resource, the terminal device uses the first channel access process by default. If the terminal device receives indication information of the network device, the indication information is used to indicate that the terminal device may use the second channel access process, where the indication information may be a PDCCH. In the existing mechanism, if the terminal device uses the second channel access process to perform channel access, the terminal device can only transmit to-be-transmitted data corresponding to the second channel access priority class. However, different channel access priority classes correspond to different to-be-transmitted data. If the second channel access priority class indicated by the network device is different from the first channel access priority class determined by the terminal device, the terminal device determines the channel access process to be used. Because of a hardware capability of the terminal device, the terminal device cannot regenerate new data (that is, to-be-transmitted data corresponding to the second channel access priority class) based on the second channel access priority class, the terminal device can only transmit to-be-transmitted data corresponding to the first channel access priority class, so that the terminal device cannot use the second channel access process. Therefore, this application sets a determining condition. Only when the determining condition is satisfied, the terminal device can use the second channel access process to perform channel access, and transmits, after the second channel access process is completed, the to-be-transmitted data corresponding to the first channel access priority class; otherwise, the terminal device performs the first channel access process by using the first channel access class determined by the terminal device, which implements sharing of a transmission opportunity obtained by the network device, complies with a fairness principle, and improves resource utilization.

Step S204. The terminal device detects whether a channel is idle based on a channel detection parameter corresponding to the channel access process.

Using the first channel access process as an example, the first channel access process includes four channel access priority classes (channel access priority class). Channel detection parameters corresponding to each channel access priority class are shown in Table 2:

TABLE 2

| Channel access priority class (p) | $m_p$ | $CW_{min,p}$ | $CW_{max,p}$ | $T_{ulm\ cot,p}$ | Allowed $CW_p$ size |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

$CW_{min,p}$ is a minimum value of a contention window of the channel access priority class, $CW_{max,p}$ is a maximum value of the contention window of the channel access priority class, and $T_{mcot,p}$ is maximum channel occupation time of the channel access priority class. $m_p$ is a component of delay time, the delay time includes fixed duration $T_f=16$ μs and dynamic duration. The dynamic duration is equal to $m_p$*slot. One slot is 9 μs, for example, $m_p=2$, and the dynamic duration is 2 slots=18 μs.

In this embodiment, the terminal device determines the first channel access priority class based on the data in the uplink buffer, receives the second channel access priority class sent by the network device, and determines the channel access process to be used based on the first channel access priority class and the second channel access priority class. The terminal device detects whether the channel is idle based on the channel detection parameter corresponding to the channel access process. The terminal device determines that the channel access process to be used may be the first channel access process, or may be the second channel access process. After using the second channel access process to access a channel, the terminal device may also transmit the to-be-transmitted data corresponding to the first channel access priority class, thereby implementing sharing of a transmission opportunity obtained by the network device, and improving resource utilization.

Figure 4:
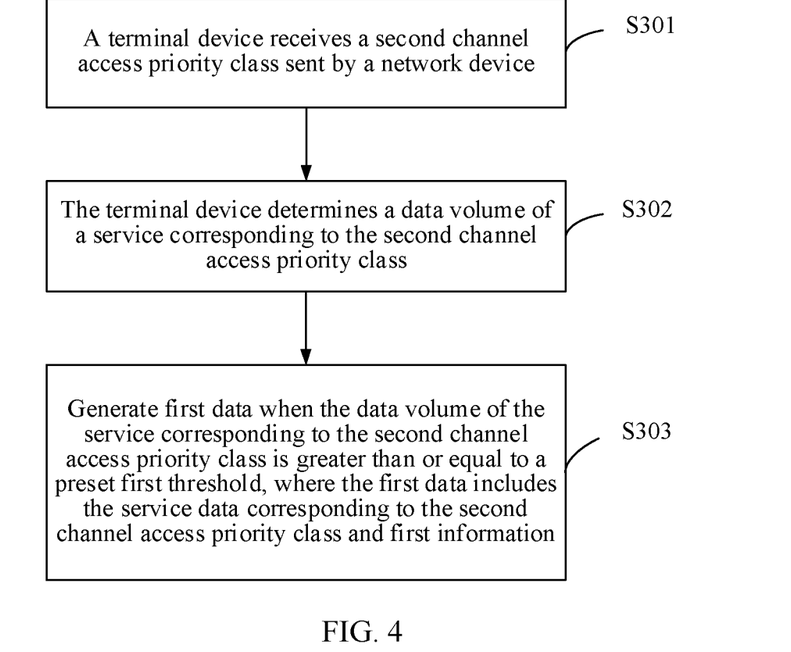
FIG. 4 is a flowchart of an information transmission method according to Embodiment 3 of this application.

FIG. 4 is a flowchart of an information transmission method according to Embodiment 3 of this application. As shown in FIG. 4, the method provided in this embodiment further includes the following steps before step S101 in Embodiment 1.

Step S301. A terminal device receives a second channel access priority class sent by a network device.

Step S302. The terminal device determines a data volume of to-be-transmitted data corresponding to the second channel access priority class from data in an uplink buffer.

For example, the terminal device determines, based on a correspondence between a channel access priority class and a QCI, a QCI corresponding to the second channel access priority class and a QCI of the data in the uplink buffer, and determines, from the data in the uplink buffer, that the QCI is a data volume of to-be-transmitted data of the QCI corresponding to the second channel access priority class.

Step S303. Generate first data when the data volume of the to-be-transmitted data corresponding to the second channel access priority class is greater than or equal to a preset first threshold, where the first data includes the to-be-transmitted data corresponding to the second channel access priority class and first information.

Optionally, the first threshold is determined by the terminal device based on a first resource. When the first resource changes, the first threshold changes accordingly. For example, the first threshold may be equal to a maximum volume of data that can be transmitted on the first resource, or the first threshold is less than a maximum volume of data that can be transmitted on the first resource. Optionally, the first threshold may also be preconfigured by the network device.

Optionally, when the data volume of the to-be-transmitted data corresponding to the second channel access priority class is less than the first threshold, the terminal device gives up using the first resource to send uplink data. The data volume of the to-be-transmitted data corresponding to the second channel access priority class is less than the first threshold, which indicates that a data volume in the uplink buffer of the terminal device is relatively small, and transmission by using the first resource may cause resource waste, thereby reducing utilization of a scheduling-free resource.

In this embodiment, by receiving the second channel access priority class sent by the network device, the terminal device determines, from the data in the uplink buffer, the data volume of the to-be-transmitted data corresponding to the second channel access priority class; generates the first data when the data volume of the to-be-transmitted data corresponding to the second channel access priority class is greater than or equal to the preset first threshold, where the first data includes the to-be-transmitted data corresponding to the second channel access priority class and the first information; and gives up using the first resource to send the uplink data when the data volume of the to-be-transmitted data corresponding to the second channel access priority class is less than the first threshold, thereby avoiding resource waste and improving utilization of the scheduling-free resource.

Figure 5:
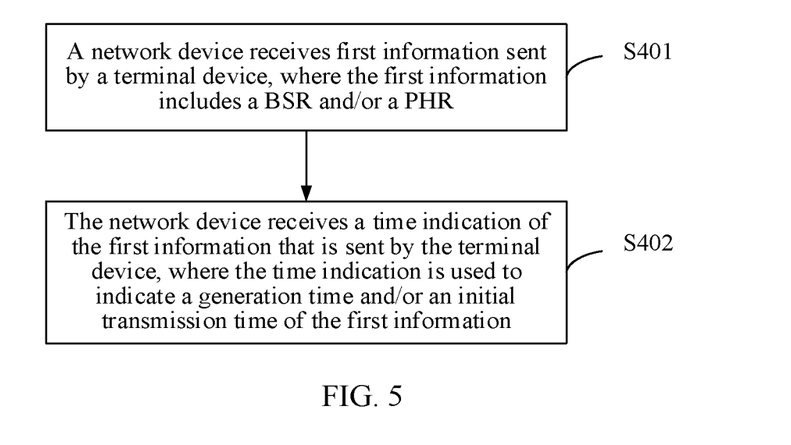
FIG. 5 is a flowchart of an information transmission method according to Embodiment 4 of this application.

FIG. 5 is a flowchart of an information transmission method according to Embodiment 4 of this application. This embodiment describes the information transmission method from a network device side. As shown in FIG. 5, the method provided in this embodiment includes the following steps.

Step S401. A network device receives first information sent by a terminal device, where the first information includes a BSR and/or a PHR.

Optionally, a time indication of the first information includes at least one of the following content:
- a transmission quantity of the first information, where the transmission quantity of the first information is a quantity of times that the terminal device sends the first information;
- an identifier of an initial transmission time unit of the first information, where the initial transmission time unit is a time unit in which the terminal device sends the first information for the first time; or
- an identifier of a generation time unit of the first information, where the generation time unit is a time unit in which the terminal device generates the first information.

Step S402. The network device receives a time indication of the first information that is sent by the terminal device, where the time indication is used to indicate a generation time and/or an initial transmission time of the first information.

Optionally, the time indication of the first information and the first information are received by using a first resource. Alternatively, the first information is received by using a first resource; and the time indication of the first information is received by using a second resource, where the first resource and the second resource do not overlap in at least one of time domain or frequency domain.

After receiving the first information and the time indication of the first information that are sent by the terminal device, the network device determines, based on the time indication of the first information, a time unit corresponding to the first information, where the time indication is used to indicate the generation time and/or the initial transmission time of the first information, so that time units corresponding to the BSR and/or the PHR and determined by the network device and the terminal device are consistent, thereby enabling the network device to schedule the terminal based on the BSR and/or the PHR, and properly allocate uplink resources.

Figure 6:
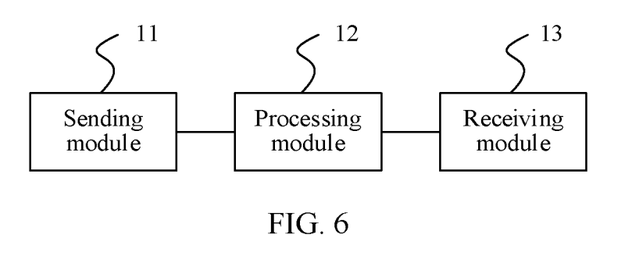
FIG. 6 is a schematic structural diagram of a terminal device according to Embodiment 5 of this application.

FIG. 6 is a schematic structural diagram of a terminal device according to Embodiment 5 of this application. As shown in FIG. 6, the terminal device provided in this embodiment includes:
- a sending module 11, configured to send first information to a network device, where the first information includes a buffer status report BSR and/or a power headroom report PHR.
- the sending module 11 is further configured to send a time indication of the first information to the network device, where the time indication is used to indicate a generation time and/or an initial transmission time of the first information.

Optionally, the terminal device further includes a processing module 12 and a receiving module 13.

Optionally, in an implementation manner:
- a processing module 12 is configured to determine a first channel access priority class based on data in an uplink buffer;
- a receiving module 13 is configured to receive a second channel access priority class sent by the network device;
- the processing module 12 is further configured to determine a channel access process to be used based on the first channel access priority class and the second channel access priority class; and
- the processing module 12 is further configured to detect whether a channel is idle based on a channel detection parameter corresponding to the channel access process.

Optionally, the processing module 12 is specifically configured to:
- determine, when the first channel access priority class is lower than the second channel access priority class, that the channel access process to be used is a first channel access process; and determine, when the first channel access priority class is higher than or equal to the second channel access priority class, that the channel access process to be used is a second channel access process, where the first channel access process is a rollback-based channel detection process, and the second channel access process is a channel detection process that is based on fixed duration; or
- determine, when the first channel access priority class is higher than or equal to the second channel access priority class, that the channel access process to be used is the first channel access process; and determine, when the first channel access priority class is lower than the second channel access priority class, that the channel access process to be used is a second channel access process, where the first channel access process is a rollback-based channel detection process, and the second channel access process is a channel detection process that is based on fixed duration.

Optionally, in another implementation manner:
- a receiving module 13 is configured to receive a second channel access priority class sent by the network device;
- a processing module 12 is configured to determine a data volume of to-be-transmitted data corresponding to the second channel access priority class from the data in the uplink buffer; and
- the processing module 12 is further configured to generate first data when the data volume of the to-be-transmitted data corresponding to the second channel access priority class is greater than or equal to a preset first threshold, where the first data includes the to-be-transmitted data corresponding to the second channel access priority class and the first information.

Optionally, the time indication and the first information are sent by using a first resource.

Optionally, the first information is sent by using a first resource; and the time indication is sent by using a second resource, where the first resource and the second resource do not overlap in at least one of time domain or frequency domain.

Optionally, the time indication includes at least one of the following content:
- a transmission quantity of the first information, where the transmission quantity of the first information is a quantity of times that the terminal device sends the first information;
- an identifier of an initial transmission time unit of the first information, where the initial transmission time unit is a time unit in which the terminal device sends the first information for the first time; or
- an identifier of a generation time unit of the first information, where the generation time unit is a time unit in which the terminal device generates the first information.

The terminal device provided in this embodiment may be configured to perform the steps performed by the terminal device in the foregoing method embodiments. Specific implementations and technical effects are similar to those of the methods in the method embodiments. Details are not described herein again.

Figure 7:
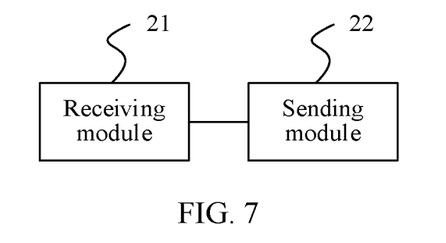
FIG. 7 is a schematic structural diagram of a network device according to Embodiment 6 of this application.

FIG. 7 is a schematic structural diagram of a network device according to Embodiment 6 of this application. As shown in FIG. 7, the network device provided in this embodiment includes:

a receiving module 21, configured to receive first information sent by a terminal device, where the first information includes a buffer status report BSR and/or a power headroom report PHR.

The receiving module 21 is further configured to receive a time indication of the first information that is sent by the terminal device, where the time indication is used to indicate a generation time and/or an initial transmission time of the first information.

Optionally, the network device further includes a sending module 22, configured to send a second channel access priority class to the terminal device.

Optionally, the time indication and the first information are received by using a first resource.

Optionally, the first information is received by using a first resource; and the time indication is received by using a second resource, where the first resource and the second resource do not overlap in at least one of time domain or frequency domain.

Optionally, the time indication includes at least one of the following content:

a transmission quantity of the first information, where the transmission quantity of the first information is a quantity of times that the terminal device sends the first information;

an identifier of an initial transmission time unit of the first information, where the initial transmission time unit is a time unit in which the terminal device sends the first information for the first time; or an identifier of a generation time unit of the first information, where the generation time unit is a time unit in which the terminal device generates the first information.

The network device provided in this embodiment may be configured to perform the steps performed by the network device in the foregoing method embodiments. Specific implementations and technical effects are similar to those of the methods in the method embodiments. Details are not described herein again.

Figure 8:
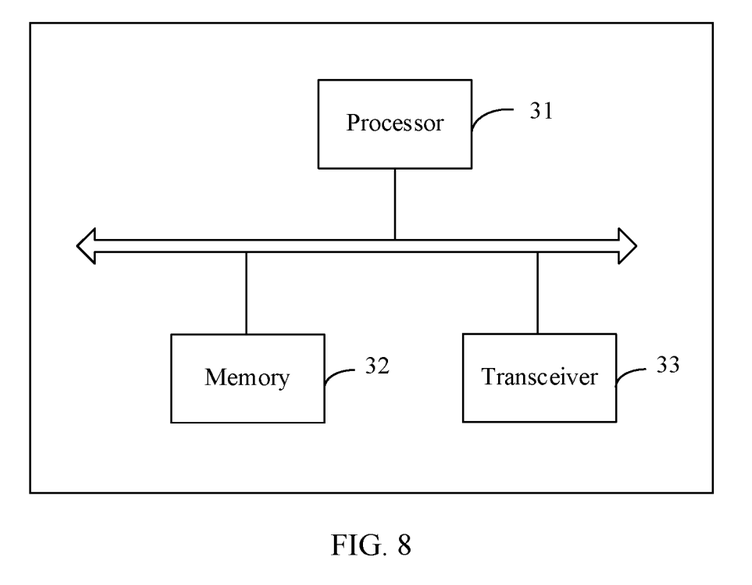
FIG. 8 is a schematic structural diagram of a terminal device according to Embodiment 7 of this application.

FIG. 8 is a schematic structural diagram of a terminal device according to Embodiment 7 of this application. As shown in FIG. 8, the terminal device provided in this embodiment includes: a processor 31, a memory 32, and a transceiver 33. The memory 32 and the transceiver 33 are connected to and communicate with the processor 31 by using a bus. The memory 32 is configured to store an instruction. The transceiver 33 is configured to communicate with another device. The processor 31 is configured to execute the instruction stored in the memory 32, to enable the terminal device to perform the steps performed by the terminal device in the foregoing method embodiments.

Figure 9:
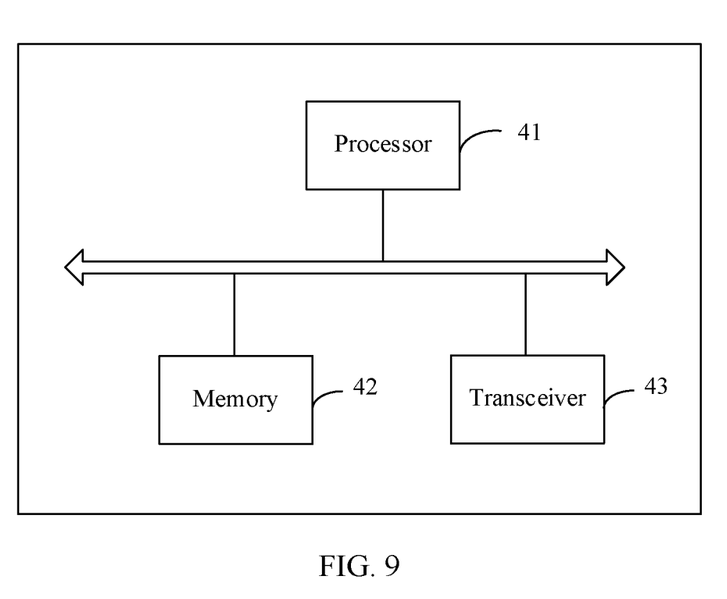
FIG. 9 is a schematic structural diagram of a network device according to Embodiment 8 of this application.

FIG. 9 is a schematic structural diagram of a network device according to Embodiment 8 of this application. As shown in FIG. 9, the network device provided in this embodiment includes: a processor 41, a memory 42, and a transceiver 43. The memory 42 and the transceiver 43 are connected to and communicate with the processor 41 by using a bus. The memory 42 is configured to store an instruction. The transceiver 43 is configured to communicate with another device. The processor 41 is configured to execute the instruction stored in the memory 42, to enable the network device to perform the steps performed by the network device in the foregoing embodiments.

It may be understood that, in this application, the processor used in the network device or the terminal device may be a central processing unit (CPU), a general processor, a digital signal processor (DSP), an application-specific integrated circuit (ASIC), a field programmable gate array (FPGA), or another programmable logic device, a transistor logic device, a hardware device, or any combination thereof. The processor can implement or execute various examples of logic blocks, modules, and circuits described with reference to content disclosed in this application. Alternatively, the processor may be a combination that implements a calculation function, for example, including one microprocessor or a combination of a plurality of microprocessors, or a combination of a DSP and a microprocessor.

The bus in this application may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be categorized as an address bus, a data bus, a control bus, or the like. For convenience of representation, the bus in the accompanying drawings of this application is not limited to only one bus or one type of bus.

In the plurality of embodiments provided in this application, it should be understood that the disclosed apparatus and method may be implemented in other manners. For example, the described apparatus embodiment is merely for illustration purposes. For example, division to the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a hardware form, or may be implemented in a form of hardware plus a software function unit.

What is claimed is:

1. A method, comprising:
   sending, by a terminal device, first information to a network device, wherein the first information comprises a buffer status report (BSR) and/or a power headroom report (PHR);
   wherein the first information is sent by using a first resource;
   sending, by the terminal device, a time indication of the first information to the network device, wherein the time indication is used to indicate a generation time and/or an initial transmission time of the first information; and wherein the time indication is sent by using a second resource, wherein the first resource and the second resource do not overlap in at least one of time domain or frequency domain.

2. The method according to claim 1, wherein the time indication comprises at least one of the following content:
a transmission quantity of the first information, wherein the transmission quantity of the first information is a quantity of times that the terminal device sends the first information;
an identifier of an initial transmission time unit of the first information, wherein the initial transmission time unit is a time unit in which the terminal device sends the first information for the first time; or
an identifier of a generation time unit of the first information, wherein the generation time unit is a time unit in which the terminal device generates the first information.

3. The method according to claim 1, further comprising:
determining, by the terminal device, a first channel access priority class based on data in an uplink buffer;
receiving, by the terminal device, a second channel access priority class from the network device;
determining, by the terminal device, a channel access process to be used based on the first channel access priority class and the second channel access priority class; and
detecting, by the terminal device, whether a channel is idle based on a channel detection parameter corresponding to the channel access process to be used.

4. The method according to claim 3, wherein the determining, by the terminal device, the channel access process to be used based on the first channel access priority class and the second channel access priority class comprises:
determining, by the terminal device when the first channel access priority class is lower than the second channel access priority class, that the channel access process to be used is a first channel access process; and determining, by the terminal device when the first channel access priority class is higher than or equal to the second channel access priority class, that the channel access process to be used is a second channel access process, wherein the first channel access process is a rollback-based channel detection process, and the second channel access process is a channel detection process that is based on fixed duration; or
determining, by the terminal device when the first channel access priority class is higher than or equal to the second channel access priority class, that the channel access process to be used is the first channel access process; and determining, by the terminal device when the first channel access priority class is lower than the second channel access priority class, that the channel access process to be used is the second channel access process, wherein the first channel access process is the rollback-based channel detection process, and the second channel access process is the channel detection process that is based on fixed duration.

5. The method according to claim 1, further comprising:
receiving, by the terminal device, a second channel access priority class from the network device;
determining, by the terminal device, a data volume of to-be-transmitted data corresponding to the second channel access priority class from the data in an uplink buffer; and
generating first data when the data volume of the to-be-transmitted data corresponding to the second channel access priority class is greater than or equal to a preset first threshold, wherein the first data comprises the to-be-transmitted data corresponding to the second channel access priority class and the first information.

6. A method, comprising:
receiving, by a network device, first information from a terminal device, wherein the first information comprises a buffer status report (BSR) and/or a power headroom report (PHR);
wherein the first information is received by using a first resource;
receiving, by the network device, a time indication of the first information that is from the terminal device, wherein the time indication is used to indicate a generation time and/or an initial transmission time of the first information; and
wherein the time indication is received by using a second resource, wherein the first resource and the second resource do not overlap in at least one of time domain or frequency domain.

7. The method according to claim 6, wherein the time indication comprises at least one of the following content:
a transmission quantity of the first information, wherein the transmission quantity of the first information is a quantity of times that the terminal device sends the first information;
an identifier of an initial transmission time unit of the first information, wherein the initial transmission time unit is a time unit in which the terminal device sends the first information for the first time; or
an identifier of a generation time unit of the first information, wherein the generation time unit is a time unit in which the terminal device generates the first information.

8. A terminal device, comprising:
a processor;
a memory; and
a transceiver,
wherein the memory is configured to store an instruction, the transceiver is configured to communicate with another device, and the processor is configured to execute the instruction stored in the memory, to enable the terminal device to perform the following method:
sending first information, wherein the first information comprises a buffer status report (BSR) and/or a power headroom report (PHR), and wherein the first information is sent by a first resource; and
sending a time indication of the first information, wherein the time indication is used to indicate a generation time and/or an initial transmission time of the first information, and wherein the time indication is sent by using a second resource, wherein the first resource and the second resource do not overlap in at least one of time domain or frequency domain.

9. The device according to claim 8, wherein the processor is further configured to:
determine a first channel access priority class based on data in an uplink buffer;
receive a second channel access priority class from the network device;
determine a channel access process to be used based on the first channel access priority class and the second channel access priority class; and
detect whether a channel is idle based on a channel detection parameter corresponding to the channel access process.

10. The device according to claim 9, wherein the processor is configured to:
  determine, when the first channel access priority class is lower than the second channel access priority class, that the channel access process to be used is a first channel access process; and determine, when the first channel access priority class is higher than or equal to the second channel access priority class, that the channel access process to be used is a second channel access process, wherein the first channel access process is a rollback-based channel detection process, and the second channel access process is a channel detection process that is based on fixed duration; or
  determine, when the first channel access priority class is higher than or equal to the second channel access priority class, that the channel access process to be used is the first channel access process; and determine, when the first channel access priority class is lower than the second channel access priority class, that the channel access process to be used is the second channel access process, wherein the first channel access process is the rollback-based channel detection process, and the second channel access process is the channel detection process that is based on fixed duration.

11. The device according to claim 8, wherein the processor is further configured to:
  receive a second channel access priority class from the network device;
  determine a data volume of to-be-transmitted data corresponding to the second channel access priority class from the data in an uplink buffer; and
  generate first data when the data volume of the to-be-transmitted data corresponding to the second channel access priority class is greater than or equal to a preset first threshold, wherein the first data comprises the to-be-transmitted data corresponding to the second channel access priority class and the first information.

* * * * *